United States Patent Office 3,132,954
Patented May 12, 1964

3,132,954
FUSED CAST REFRACTORY AND
METHOD OF MAKING
Allen M. Alper, Horseheads, and Robert N. McNally, Corning, N.Y., assignors, by mesne assignments, to Cohart Refractories Company, a corporation of Delaware
No Drawing. Filed July 28, 1961, Ser. No. 127,475
5 Claims. (Cl. 106—59)

This invention relates to improvements in fused cast chrome-magnesia refractory compositions, articles made thereof, and the method of making them.

Fused cast chrome-magnesia refractories are known for their ideal suitability for refractory linings in steel-making furnaces, particularly in open hearth and electric furnaces. They are characterized by marked resistance to heat shock or spalling in use and in combination with good resistance to slag attack. These refrractories comprise, as essential constitutents, a combination of MgO and $Cr_2O_3$ in which MgO is commonly the predominant constituent in the combination. Additionally, they may contain $Al_2O_3$ and FeO with small amounts of $SiO_2$ and CaO, as shown in United States Patents 2,599,566 and 2,690,974 to R. J. Magri, Jr. The cast refractory blocks are found to be polyphase with a random mixture of two predominant phases: chrome-containing spinel and periclase or magnesio-wustite. The periclase or magnesio-wustite phase can contain varying amounts of $Al_2O_3$ and/or $Cr_2O_3$ in solid solution. Randomly interspersed between grains of the predominant phases is an olivine phase when $SiO_2$ is present. The structure of the cast blocks is characterized by microscopic holes in a very dense crystalline matrix which shows virtually no intergranular porosity.

These chrome-magnesia refractories are made by arc melting a charge composed of a mixture of appropriate raw materials containing the required oxides in proper amounts, casting the fused molten charge into preformed molds and, if desired, annealing in the mold, for example, as shown in United States Patent 1,615,750 to G. S. Fulcher.

From production experience, it has been found that recovery of merchantable cast bricks or blocks of these chrome-magnesia compositions is consistently low for the total number of molds poured. A principal cause of the low recovery of merchantable product is the formation of cracks during cooling in the mold. As a result, the cast products break up or crumble during removal from the mold or during handling and shipping.

Moreover, those cast bricks with cracks which are not sufficiently large to result in broken or crumbled product during handling, suffer a short life from adverse effects of slag penetration in steel-making furances. Liquid slag and slag vapors coming into contact with the brick penetrate into these cracks. Under temperature cycling conditions of steel-making furnaces, the iron oxide-containing slag in the crack is caused to expand or grow in volume due to changing oxidation states of the iron oxides. The ultimate result is bursting of the brick. Although these chrome-magnesia refractories have good resistance to the erosion action of basic slags, such as used in open hearth furnaces, improvement is always desirable to extend the life of the refractory lining.

Aside from the adverse slag growth effects, these refractory compositions tend to grow or expand in volume during thermal cycling in service. This can lead to disruption of the refractory lining in the furance, e.g., in the roof of an open hearth.

It is an object of this invention to eliminate or greatly minimize cracking of fused cast chrome-magnesia refractory during cooling in the mold.

It is another object of this invention to provide greatly improved recovery of merchantable fused cast chrome-magnesia refractory.

It is a further object of this invention to provide a fused cast chrome-magnesia refractory with greater resistance to slag penetration and basic slag wear.

It is a still further object of this invention to provide a fused cast chrome-magnesia refractory with greatly reduced growth during thermal cycling.

Other objects and advantages will be apparent from the following disclosure.

It has been discovered that the foregoing objects can be attained in a fused cast refractory consisting essentially of 40% to 78% MgO, 4% to 58% $Cr_2O_3$, up to 33% $Al_2O_3$, up to 14.5% FeO, up to 4.5% $SiO_2$, up to 10% CaO, and the total of such oxides amounting to at least 87%, by incorporating 0.03% to 7% of fluorine in the fused molten refractory and thereafter cooling the molten refractory in a mold to form a solid cast shape.

The fused cast refractory of the invention, broadly and in preferred ranges, consists essentially of:

|  | Broad, percent | A, percent | B, percent | C, percent |
|---|---|---|---|---|
| MgO | 40–78 | 45–75 | 45–76 | 40–73. |
| $Cr_2O_3$ | 4–58 | 4–15 | 12–29 | 26–53. |
| $Al_2O_3$ | Up to 33 | 9.5–33 | 1.5–25 | Up to 20. |
| FeO | Up to 14.5 | Up to 6.4 | Up to 14.5 | Up to 10. |
| $SiO_2$ | Up to 4.5 | Up to 3 | Up to 3 | Up to 4. |
| CaO | Up to 10 | Up to 8 | Up to 8 | Up to 8. |
| Total such oxides | At least 87 | At least 91 | At least 91 | At least 91. |
| $F_2$ | 0.03–7 | 0.07–5 | 0.07–5 | 0.05–5. |

Throughout this specification and the claims, the composition is expressed in terms of weight percent, based on oxide and fluorine analysis, and, as is usual practice with chrome-magnesia refractories, the total analyzed Fe is calculated and designated as FeO.

The fluorine can be provided by any one of a number of metal fluorides, which may be mixed with other batch ingredients prior to melting. Generally, the metal fluorides would be one of those having a boiling point of at least about 1200° C. because fluorides with too low a boiling point will almost completely vaporize off from the batch charge during the melting operation before they can fuse with the other ingredients. Thus, it has been determined, as a practical matter, that those metal fluorides with boiling points not substantially lower than 1200° C. will fuse into the molten pool formed during melting. Due to the low partial pressure of fluorine in the bath as a result of the lower concentration of fluorine when fused in the refractory bath and to the fact that equilibrium between the partial pressure of fluorine in the bath and above the bath is not attained in the relatively short fusion time before casting, a substantial amount of fluorine will be retained in the bath at the time of casting.

Examples of suitable metal fluorides and their boiling points are as follows:

| Fluoride | $CaF_2$ | $AlF_3$ | $MgF_2$ | $BaF_2$ | $SrF_2$ | NaF |
|---|---|---|---|---|---|---|
| B.P., °C | 2,500 | 1,260 | 2,239 | 2,137 | 2,460 | 1,705 |

Mixtures or complex metal fluorides with sufficiently high boiling points can also be used, e.g., cryolite.

In practicing the present invention, suitable raw materials are proportioned in accordance with the desired final composition, preferably all being premixed prior to charging into the melting furnace, and then are processed according to the well-known fusion casting techniques, as disclosed in the aforementioned prior patents.

Illustrative examples of some of the raw materials that can be used are as follows (nominal composition):

| Calcined magnesite | Transvaal chrome ore | Alumina | Fluorspar |
|---|---|---|---|
| 98.0% MgO | 44% $Cr_2O_3$ | 99.2% $Al_2O_3$ | 97.3% $CaF_2$ |
| 1.0% CaO | 23% FeO | 0.45% $Na_2O$ | 1.2% $CaCO_3$ |
| 0.4% $SiO_2$ | 13% $Al_2O_3$ | 0.03% $Fe_2O_3$ | 1.1% $SiO_2$ |
| 0.2% $Al_2O_3$ | 12% MgO | 0.02% $SiO_2$ | 0.1% $Fe_2O_3$ |
| 0.2% $Fe_2O_3$ | 4% $SiO_2$ | 0.3% Ignition loss | 0.3% Ignition loss |
| 0.2% Ignition loss | 0.5% CaO | | |

When it is desired to minimize the FeO content in the refractory of the present invention, other suitable chrome ores can be used. The following are examples (nominal composition):

|  | Iranian chrome ore, percent | Turkish chrome ore, percent |
|---|---|---|
| $Cr_2O_3$ | 52.7 | 41.8 |
| MgO | 17.4 | 16.8 |
| FeO | 13.3 | 14.0 |
| $Al_2O_3$ | 8.5 | 20.2 |
| $SiO_2$ | 4.2 | 3.8 |
| CaO | | 0.3 |

Moreover, pure $Cr_2O_3$ can be used instead of chrome ore when it is desired to omit FeO.

The melt (casting) analyses given in Table I are illustrative of the invention composition:

*Table I*

| Melt | MgO[a] | $Cr_2O_3$ | $Al_2O_3$ | FeO | $SiO_2$ | CaO | Fluorine |
|---|---|---|---|---|---|---|---|
| 1 | 62.92 | 6.5 | 25.4 | 3.4 | 0.7 | 0.92 | 0.16 |
| 2 | 70.36 | 9.0 | 9.8 | 5.5 | 1.3 | 3.1 | 0.94 |
| 3 | 51.2 | 9.2 | 32.6 | 5.0 | 1.1 | 0.81 | 0.09 |
| 4 | 68.95 | 16.6 | 3.8 | 1.7 | 1.5 | 4.0 | 3.45 |
| 5 | 65.1 | 18.6 | 3.2 | 2.2 | 0.9 | 6.0 | 4.0 |
| 6 | 56.73 | 19.8 | 6.6 | 10.2 | 2.0 | 2.8 | 1.87 |
| 7 | 62.7 | 19.9 | 4.0 | 5.7 | 1.3 | 3.6 | 2.8 |
| 8 | 56.99 | 21.3 | 6.8 | 11.6 | 1.9 | 1.1 | 0.31 |
| 9 | 56.18 | 21.5 | 7.1 | 10.8 | 2.0 | 1.7 | 0.72 |
| 10 | 54.97 | 21.6 | 7.5 | 12.6 | 2.2 | 0.97 | 0.16 |
| 11 | 68.0 | 26.8 | 2.9 | | 0.8 | 0.5 | 1.0 |
| 12 | 55.3 | 43.0 | | | | 1.0 | 0.7 |

[a] The balance by difference and includes minor impurities totaling less than 1%.

The desired objects are effectively obtained, without additional disadvantages, only when the fluorine is incorporated in a composition having all the necessary oxides within the prescribed ranges. It should be noted that the maximum limit of FeO is essential to maintaining satisfactory dimensional stability in service. Below the prescribed minimum limits for fluorine, no significant reduction of cracking in the mold or decrease of cyclic growth is found. Fluorine in excess of the prescribed maximum limits materially decreases slag resistance below a satisfactory level and results in poor dimensional stability in service as a result of substantial shrinkage, especially where $Al_2O_3$ is high and $Cr_2O_3$ is low.

As an illustration of the improvement in basic slag erosion resistance and in thermal cycling growth of the invention, a comparison of the degree of erosion and the linear growth on thermal cycling under simulated open hearth operation for three example melts within the invention and for one example melt without fluorine is given in Table II.

The erosion data is based upon the following test: a refractory specimen 1½″ x 1″ x ½″ is repeatedly passed through a falling stream of molten slag at 1700° C. for 2 hours. The continuously repeated contact of molten slag with the specimen results in a change of thickness. The result is expressed in terms of a percentage reduction in thickness.

The thermal cycling growth data is based upon the following test: a refractory specimen 1½″ x ½″ x ¼″ is heated to 1400° C. and then cooled to about room temperature. This consitutes one cycle and the test comprises 12 continuous cycles. The length of the specimen is measured before and after the tests. The difference in the two measurements is expressed in terms of linear percentage change in length.

*Table II*

| Melt | Fluorine, Percent | Erosion reduction in thickness, percent | Thermal cycling growth linear, percent |
|---|---|---|---|
| 5[a] | 0 | 39 | 1.2 |
| 8 | 0.31 | 24 | 0.67 |
| 9 | 0.72 | 30 | 0.5 |
| 6 | 1.87 | 15 | 0.65 |

[a] 5.4% $Al_2O_3$, 22.7% $Cr_2O_3$, 9.7% FeO, 1.6% $SiO_2$, 0.37% CaO, balance MgO.

Hence Table II clearly shows the reduction of erosion and cyclic growth by the incorporation of fluorine in the range stated for this invention. While the reason for the reduction in cyclic growth is not precisely known, it is thought that the customary growth resulting from cyclic phase changes is retarded by the additional fluorine because such addition is accompanied by a shrinkage which counteracts the customary growth. Therefore, an overall decrease in thermal cycling growth results.

The addition of fluorine to the chrome-magnesia refractory results in a fluoride phase randomly dispersed between the grains of the predominant phases, similar to the olivine phase. It is not definitely known what the precise fluoride is that forms this phase, but it is suspected that it is not necessarily the same metal fluoride utilized to incorporate the fluorine in this refractory.

Moreover, no apparent change in size or shape of the chrome-containing spinel and periclase or magnesio-wustite crystals occurs. Also, the structure is characterized by the same denseness and virtual absence of intergranular porosity as is found when fluorine is absent.

It should be understood that the illustrated embodiments of the invention may be varied in their details within the spirit of the invention. As for example, the raw material providing the fluorine need not be premixed with the other batch materials, but may be added at any stage of the fusing or pouring operations and may even be placed in the mold prior to pouring. Accordingly, it is intended that the scope of the present invention be limited only by the appended claims.

What is claimed is:

1. The process for preventing cracking of fused cast chrome-magnesia refractory during cooling in the mold which comprises incorporating 0.03% to 7% of fluorine in a fused molten refractory consisting essentially of 40% to 78% MgO, 4% to 58% $Cr_2O_3$, up to 33% $Al_2O_3$, up to 14.5% FeO, up to 4.5% $SiO_2$, up to 10% CaO, and the total of such oxides amounting to at least 87% and thereafter cooling the molten refractory in a mold to form a solid shaped article.

2. A fused cast refractory consisting essentially of, by weight, 40% to 78% MgO, 4% to 58% $Cr_2O_3$, up to 33% $Al_2O_3$, up to 14.5% FeO, up to 4.5% $SiO_2$, up to 10% CaO, the total of such oxides amounting to at least 87%, and 0.03% to 7% of fluorine.

3. A fused cast refractory consisting essentially of, by weight, 45% to 75% MgO, 4% to 15% $Cr_2O_3$, 9.5% to 33% $Al_2O_3$, up to 6.4% FeO, up to 3% $SiO_2$, up to 8% CaO, the total of such oxides amounting to at least 91%, and 0.07% to 5% of fluorine.

4. A fused cast refractory consisting essentially of, by weight, 45% to 76% MgO, 12% to 29% $Cr_2O_3$, 1.5% to 25% $Al_2O_3$, up to 14.5% FeO, up to 3% $SiO_2$, up to 8% CaO, the total of such oxides amounting to at least 91%, and 0.07% to 5% fluorine.

5. A fused cast refractory consisting essentially of, by weight, 40% to 73% MgO, 26% to 53% $Cr_2O_3$, up to 20% $Al_2O_3$, up to 10% FeO, up to 4% $SiO_2$, up to 8% CaO, the total of such oxides amounting to at least 91%, and 0.05% to 5% of fluorine.

References Cited in the file of this patent

UNITED STATES PATENTS

| | | |
|---|---|---|
| 2,235,077 | McMullen | Mar. 18, 1941 |
| 2,599,566 | Magri | June 10, 1952 |

UNITED STATES PATENT OFFICE
CERTIFICATE OF CORRECTION

Patent No. 3,132,954                           May 12, 1964

Allen M. Alper et al.

It is hereby certified that error appears in the above numbered patent requiring correction and that the said Letters Patent should read as corrected below.

In the grant, lines 3 and 13, and in the heading to the printed specification, line 6, name of assignee, for "Cohart Refractories Company", each occurrence, read -- Corhart Refractories Company --.

Signed and sealed this 20th day of October 1964.

(SEAL)
Attest:

ERNEST W. SWIDER
Attesting Officer

EDWARD J. BRENNER
Commissioner of Patents